Aug. 8, 1967 V. H. CLAUSEN ETAL 3,334,891
VACUUM PICKUP AND TRANSFER APPARATUS
Filed Sept. 17, 1965 2 Sheets-Sheet 1

VICTOR H. CLAUSEN
ARNOLD ZWEIG
INVENTORS

BY Seed & Berry

ATTORNEYS

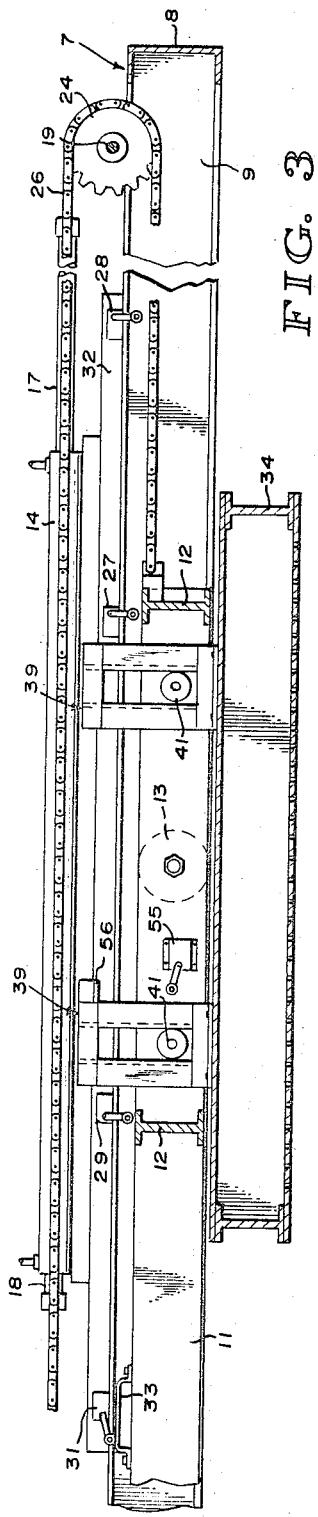
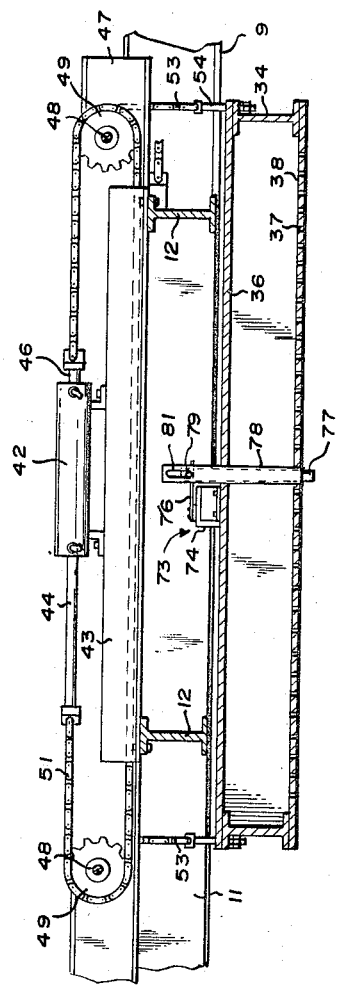
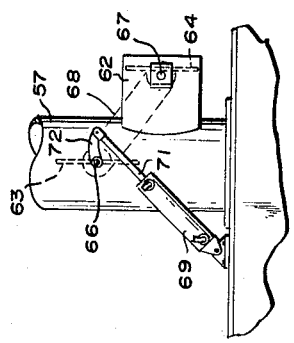
FIG. 3
FIG. 4
FIG. 5
VICTOR H. CLAUSEN
ARNOLD ZWEIG
INVENTORS
BY Seed & Berry
ATTORNEYS United States Patent Office 3,334,891
Patented Aug. 8, 1967

3,334,891
VACUUM PICKUP AND TRANSFER
APPARATUS
Victor H. Clausen, Bellevue, and Arnold Zweig, Olympia,
Wash., assignors to Simpson Timber Company, a corporation of Washington
Filed Sept. 17, 1965, Ser. No. 488,164
7 Claims. (Cl. 271—12)

The present invention relates to sheet handling apparatus and more particularly to a vacuum pickup and transfer apparatus for lifting individual sheets of flexible material such as wood veneer or the like from a stack and transferring the same for deposit on a moving conveyor.

The present invention relates particularly to industries wherein the problem arises of having a pick up and transfer individual sheets of lightweight material which is not adapted for handling with conventional mechanical devices or, in some instances, to manual handling either because of the character of the material or because of the economics involved. Although the present invention is not limited to the plywood industry, wood veneer utilized in plywood panel layup systems presents such a problem and the present disclosure will be described in relation to wood veneer handling but it will be understood that the invention applies equally well to other types of materials wherein similar problems are involved.

As will be understood by those skilled in the art, wood veneer used for plywood panel layup is rather rough and flimsy and susceptible to splitting and tearing when handled in large sheets, hence even manual handling presents a problem and mechanical handling is usually impractical or even impossible. In the prior art, the veneer has usually been handled manually which is costly and wasteful because of the damage which occurs during handling. In most instances, core veneers may be made up of individual random width veneer pieces which are placed individually by hand. Recent developments have made possible the joining of individual veneer pieces into a composite sheet which offers even greater problems in handling since the pieces are joined only temporarily for layup purposes. The present invention provides an apparatus for lifting and transferring such veneer sheets either composite or otherwise without damage and in an economical and efficient manner. The present apparatus may be utilized effectively in automated plywood layup systems to eliminate much of the manual labor experienced by prior art methods and machines.

The primary object of the present invention is, therefore, to provide an improved pickup and transfer apparatus for removing individual sheets from a stack and depositing the same vertically onto a moving conveyor.

Another object of the present invention is to provide a pickup and transfer apparatus of the character described wherein a movable vacuum head is lowered vertically to the stack with sensing means to insure the removal of a single sheet from the stack and to transfer the sheet laterally and deposit the same vertically onto a moving conveyor.

Another object of the present invention is to provide a vacuum pickup and transfer apparatus of the character described which eliminates the need for manual labor and which provides for veneer handling without damage to the veneer sheets thereby enabling greater efficiency and economy.

The means by which the foregoing objects and other advantages, which will be apparent to those skilled in the art, are accomplished, are set forth in the following specification and claims and are illustrated in the accompanying drawings dealing with a preferred embodiment of the apparatus. Reference is now made to the accompanying drawings in which:

FIG. 3 is a cross sectional view taken along lines 3—3 of FIG. 2;

FIG. 4 is a cross sectional view taken along lines 4—4 of FIG. 2; and

FIG. 5 is an elevational detail taken along lines 5—5 of FIG. 2.

Figure 1:
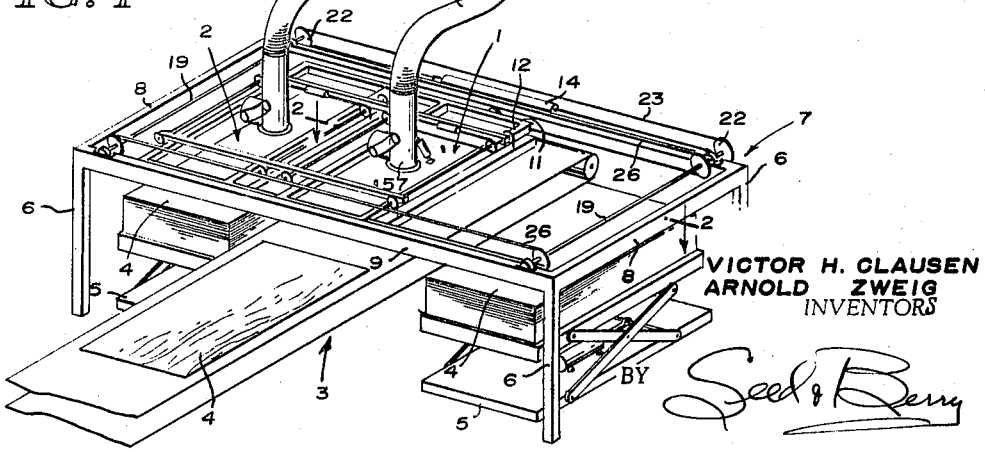
FIG. 1 is a perspective view of a pickup and transfer apparatus.

Referring now to the drawings wherein like reference numerals indicate identical parts in the various views, FIG. 1 illustrates the preferred embodiment of the invention wherein two identical pickup and transfer heads indicated generally at 1 and 2 are mounted in tandem so as to operate simultaneously for the alternate pickup and deposit of veneer sheets from stacks located on either side of an endless belt conveyor indicated schematically at 3. It will be understood of course, that the conveyor 3 may be a part of any conveyor system for further handling or treating of the veneer such as an automatic plywood layup system or the like. By virtue of the particular construction of the present apparatus, it will be apparent to those skilled in the art that a plurality of pickup and transfer units may be assembled for simultaneous operation such as the two tandem units shown in FIG. 1 or that a single unit may be installed for operation from one side only of the conveyor system. The double unit assembly is shown as the preferred example in FIG. 1 and a detailed description of only one of the pickup units will be made with reference to the drawings and with the understanding that additional units will be identical in structure.

Referring to FIG. 1, loose stacks of veneers or other sheet material 4 are located on either side of the conveyor 3 as the supply of sheets to be loaded on the conveyor one at a time.

The stacks of veneer sheets 4 may be supported by incremental lift tables 5 which may be of any construction well known in the prior art. The tables 5 may be controlled by limit switches or the like carried by the movable vacuum heads presently to be described. The upright supports 6 support a rigid rectangular frame indicated generally at 7 which overlies the conveyor and extends transversely of the conveyor to a position above each of the stacks adjacent thereto. The frame 7 provides the support and guide tracks for the pickup heads 1 and 2 and may be constructed from any suitable beams such as the channels illustrated in FIG. 3. The frame 7 includes the end channel members 8 and identical side channels 9 which may be integrally welded or otherwise constructed with the legs of the channel members extending inwardly providing a guide track along the longitudinal members 9 for the reception of support rollers presently to be described.

Figure 2:
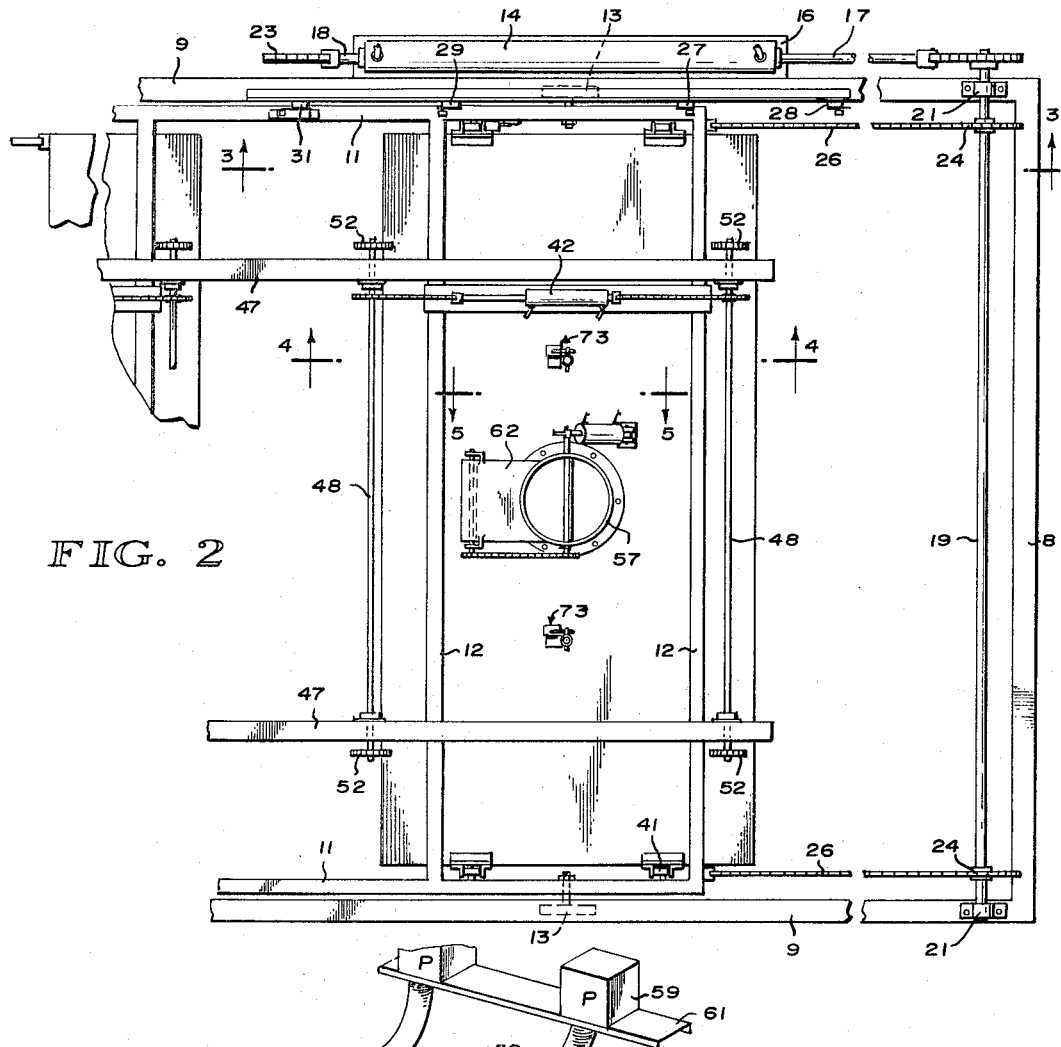
FIG. 2 is a top plan view taken along lines 2—2 of FIG. 1.

As seen in FIGS. 1 and 2, a movable support frame comprising the longitudinal beams 11 and transverse beams 12 provides a rigid movable structure capable of being reciprocated transversely across the conveyor and stacks within the support frame 7. The movable frame is supported within the frame 7 by means of the support rollers 13 carried thereby on suitable stub shafts. The rollers 13 engage the channels of the respective longitudinal members 9 of the frame 7 and are guided along the bottom legs thereof. In the present embodiment, both pickup heads 1 and 2 are supported from the movable frame in identical manner. As illustrated in FIG. 1, when the movable frame is in the extreme left hand position, the pickup head 2 will be directly above the one stack of sheets and the head 1 will be directly above the conveyor for depositing a sheet. Likewise, in the extreme right hand position, the pickup head 1 will be above the other stack of sheets and the head 2 will be in the drop position above the conveyor 3.

The mechanism for reciprocating the movable frame constitutes a conventional double acting hydraulic or pneumatic cylinder 14 mounted on a suitable bracket structure 16 at one side of the frame 7. The cylinder 14 includes the two piston rods 17 and 18 connected to a single piston member (not shown) within the cylinder 14. Transverse shafts 19 are mounted on top of the frame 7 adjacent each end thereof in bearing blocks 21 with each of the shafts being provided with a sprocket 22 about which is trained a drive chain 23 with the opposite ends of the chain being connected to the respective piston rods 17 and 18. In this manner, reciprocation of the piston rods 17 and 18 in either direction serves to drive the sprockets 22 in the same direction at the same speed and consequently the shafts 19 are likewise driven. Each shaft 19 is provided with a sprocket 24 fixed thereto inboard of each of the side channels 9 of the frame 7. Identical drive chains 26 are trained about the sprockets 24 with the ends of each chain 26 being dead headed or fixed to opposite sides of the transverse end beams 12 on the movable frame as illustrated most clearly in FIG. 3. With the various drive chains and sprockets described it will be apparent that reciprocation of the piston rods 17 and 18 serves to shift the movable frame from one end to the other of the stationary frame 7 and it will be understood that the stroke of the piston rods is sufficient to move the movable frame from one end of the fixed frame 7 to the opposite end.

In order to control the movement of the movable frame, a first set of limit switches 27 and 28 is located at the right end of the frame 7 and a second set of switches 29 and 31 is located at the opposite end of the frame on a suitable angle bracket 32 carried by the longitudinal channel 9 as illustrated in FIG. 3. The switches 27–28 and 29–31 are so located that the switch arms therefor are positioned to contact a switch operator 33 carried on the longitudinal beam 11 of the movable frame. In the preferred embodiment, a pair of limit switches is provided at each end of the fixed frame 7 as described for the purpose of producing a signal as the movable frame approaches its end limit position so as to retard the movement of the frame with the second switch providing a signal to positively stop the frame. In this manner, the inertia effect of a sudden stop of the frame is avoided and it will be understood that the switches are so positioned as to allow the frame to stop with the pickup head directly above one of the stacks of sheet material.

The vacuum pickup head for each unit comprises a rectangular frame which may be constructed from beams such as the eye beam 34 illustrated in FIGS. 3 and 4 which may be welded or otherwise connected to form a rigid frame. A top wall or panel 36 is secured to the beams 34 and the bottom wall 37 is secured to the bottom of the frame structure with the wall 37 being provided with closely spaced holes or perforations 38 for the passage of air. Each side of the vacuum head is provided with a pair of upstanding guide structures 39 which may be identical in structure and fabricated from angle irons or the like so as to form guides for vertical reciprocation of the vacuum head. The guide structures 39 each engage a guide roller 41 mounted on the longitudinal beam 11 of the movable frame as shown clearly in FIGS. 3 and 4.

Each vacuum head is raised and lowered by means of a hydraulic or pneumatic cylinder 42 mounted on a support beam 43 carried by the movable frame as illustrated in FIG. 4. The cylinders 42 are conventional double acting cylinders and include a piston member with two piston rods 44 and 46 extending therefrom. Spaced support beams 47 are mounted on the beams 12 of the movable frame and serve to mount rotatable shafts 48 which extend therebetween and are carried in suitable bearings therein. As shown in FIGS. 1 and 4, a shaft 48 is located above and parallel to each side edge of the pickup head. Each shaft 48 is provided with a sprocket 49 in alignment with the piston rods 44 and 46 and a chain 51 extends about both sprockets with the ends of the chains being connected to the respective piston rods as illustrated in FIG. 4. Thus, reciprocation of the piston rods rotates the shafts 48 simultaneously in the same direction. Mounted on each end of each shaft 48 outboard of the beam 47, is a sprocket 52 having a chain 53 affixed at one end to the periphery thereof and at the opposite end to the vacuum head by means of a connecting bolt 54. It will be noted that all of the chains 53 are passed about the associated sprockets 52 in the same direction in such a manner that the chains are lowered or raised in unison as the sprockets are rotated. In this manner, the vacuum head is raised and lowered by operation of the cylinder 42 which reciprocates the piston rods 44 and 46 in one direction or the other. The guide assemblies 39 and rollers 41 serve to guide the vertical movement of the vacuum head.

The operation of the cylinders 42 as well as the cylinder 14 may be controlled by any suitable control means such as an electrical switch and solenoid valve arrangement which may be part of a programming circuit or which may be manually controlled as desired, as will be appreciated by those skilled in the art. In the preferred embodiment each incremental lift table 5 may be controlled by a limit switch 55 having a switch arm for contacting an extension 56 on one of the guide structures 39 when the head reaches a predetermined lower limit of travel. Thus when the vacuum head travels downwardly to the point where the switch arm is contacted, a signal is produced to raise the lift table. The details of the structure of the lift table 5 form no part of the present invention and it is necessary only to point out that the lift table will be operated to raise the level of the stack of veneers a small increment upon the closing of an electrical circuit by means of the limit switch 55. In this manner, the level of the top of the stack is maintained within a predetermined range as the veneers are removed. In the alternative, a simple weight-responsive spring-actuated table, similarly well-known in the prior art, may be used to maintain the stack at a desired constant level as veneers are removed.

Each of the vacuum heads is connected to a vacuum conduit 57 which includes a flexible portion 58 connected to a source of vacuum pressure such as a pump unit 59 carried by an overhead beam or the like 61 above the unit. The flexible portion 58 of the vacuum conduit permits transverse movement of the movable frame as described. A vent pipe 62 is located in the rigid portion of the pipe 57 for the purpose of admitting atmospheric pressure to the vacuum head as will be presently described. The conduit 57 also includes a valve 63 and the vent pipe 62 is provided with a valve 64. The valves 63 and 64 may be mounted on rotatable shafts 66 and 67 respectively with each shaft including a sprocket with a chain member 68 being trained about the sprockets so that the shafts are rotated simultaneously. As shown most clearly in FIGS. 2 and 5, the valves 63 will be in the open position when the valve 64 is in the closed position and vice versa, whereby the vacuum chamber is connected either to vacuum pressure from the pump 59 or vented to atmosphere through the vent 62. A double acting fluid cylinder 69 is pivotally connected to the top wall 36 of the vacuum head with the piston rod 71 being pivotally connected to a crank arm 72 for selectively rotating the shafts 66 and 67 in either direction. With this arrangement, the vacuum head may be subjected to vacuum pressure by operation of the cylinder 69 for the purpose of picking up and holding a veneer sheet and then vented to atmosphere by reversal of the operation of the cylinder for the purpose of allowing the veneer to drop on the conveyor 3.

Since the level of the stack of veneer sheets 4 may vary within the range of operation of the vacuum head, sensing means is provided for detecting the position at which the downward travel of the vacuum head must be halted and the operation of the cylinder 42 reversed so as to raise the sheet for transfer to the conveyor. The signal thus produced may be utilized to control the operation of the cylinder in a manner well known to those skilled in the art. It has also been found in practice that the vacuum head cannot be allowed to contact the stack so as to exert downward pressure thereon because of the possibility of lifting a plurality of sheets. Since the sheets often have holes, cracks or other openings, the vacuum pressure is ofttimes sufficient to lift more than one sheet. According to the preferred embodiment illustrated, the vacuum head is lowered to a position in close proximity to the surface of the top sheet and halted with the sheet being "sucked" upwardly to adhere to the bottom wall of the vacuum chamber. For this purpose, one or a plurality of sensing switch units 73 are mounted on the vacuum head with two such units being illustrated in FIG. 2. The details of the sensing switch units are shown most clearly in FIG. 4. As illustrated, a switch 74 is mounted on the top wall 36 of the vacuum chamber and includes a switch arm 76. An elongated sensing pin 77 is mounted in a sleeve 78 with the vertical movement of the pin within the sleeve being limited by a cross pin 79 operating within the slot 81 in the top end of the sleeve. As shown in FIG. 2, the cross pin 79 normally contacts the top side of the switch arm 76 with the weight of the sensing pin 77 serving to maintain the switch in the closed condition. As the vacuum head moves downwardly, pin 77 contacts the surface of the top sheet 4 on the stack which pushes the pin upwardly allowing the switch 74 to be opened to complete a circuit for reversing the direction of travel of the head.

In describing the operation of the device, only one of the vacuum heads will be considered and it will be understood that the remaining head, if one is used, will be picking up while the one is dropping and vice versa so as to perform a continuous operation. Assuming that the conveyor 3 is running and that the stacks of veneer sheets 4 are ready for loading, the cylinder 14 is actuated to move the movable frame to either the right or left extreme position. A signal from the first switch, either 27 or 29, is used to retard the movement of the frame and the end switch, either 28 or 31 produces a signal to positively halt the movement with the vacuum head above the appropriate stack. At this time the cylinder 69 is positioned as shown in FIG. 5 with valve 63 in the vacuum conduit in the open position and valve 64 is closed. The cylinder 42 is then actuated to lower the vacuum head downwardly until the switch 74 is operated so as to reverse the cylinder to raise the head with a single veneer adhering thereto. As soon as the head is raised, the cylinder 14 is reversed to move the movable frame to the opposite extent of travel and to stop. When the vacuum head carrying the sheet is above the conveyor, the cylinder 69 is reversed to vent the vacuum head to atmosphere so as to drop the sheet vertically onto the conveyor. The cycle is then repeated and, as aforementioned, the movement of the several cylinders and the function of the various switches may be controlled by a programming circuit or may be carried out by manual switch control.

It will be readily understood by those skilled in the art that the present invention presents significant advances in sheet handling of the character described. It will also be understood that numerous modifications and alterations to the described structure may be accomplished without departing from the spirit and scope of the invention and applicants intend to be limited only to a liberal interpretation of the specification and claims.

What is claimed as new and desired to be secured by Letters Patent is:

1. A vacuum pickup and transfer apparatus for loading sheet material onto a conveyor comprising in combination; means for supporting a stack of sheet material adjacent the conveyor, a movable frame, means to mount said movable frame for movement between a first position above said stack and a second position above said conveyor, means to selectively move said frame, a pickup head including a vacuum chamber, means to mount said head on said frame for vertical reciprocation, means to control the vertical movement of said head, a source of vacuum pressure, means to selectively apply vacuum pressure to said chamber and to vent the chamber to atmosphere, and sensing means for producing a signal to limit the downward travel of the head to a position closely adjacent the top sheet on said stack without contacting the sheet during downward travel.

2. A vacuum pickup and transfer apparatus for loading sheet material onto a conveyor comprising, in combination, vertically adjustable support means for maintaining a supply stack of sheet material adjacent said conveyor, a rigid frame, means to mount said rigid frame above said stack with said frame extending transversely above said conveyor, a movable frame, means to mount said movable frame on said rigid frame for movement between a first position above said stack and a second position above said conveyor, motor means connected to move said movable frame between said first and second positions, a pickup head including means defining a vacuum chamber, means to mount said pickup head on said movable frame for vertical reciprocation, motor means connected to control the vertical movement of the pickup head, a source of vacuum pressure, means to selectively apply vacuum pressure to said chamber and to vent said chamber to atmosphere, and sensing means for producing a signal to limit the downward travel of said pickup head to a position closely adjacent the top sheet on said stack without contacting the sheet during downward travel, whereby said pickup head may be moved to the first position and lowered to pickup a single sheet by means of vacuum pressure and subsequently raised and transferred to the second position to drop said sheet vertically onto said conveyor by venting said vacuum chamber to atmosphere.

3. The device according to claim 2 wherein, said motor means comprises a double acting fluid motor with a reciprocating piston rod, a rotatable shaft mounted on said fixed frame located adjacent each end thereof, a first sprocket on each said shaft located outboard of said frame in alignment with said rod, a drive chain trained about each sprocket with the opposite ends thereof connected to the opposite ends of said rod, whereby said rods are caused to rotate simultaneously in the same direction, second sprockets carried by each shaft, and second chain means trained about said second sprockets with the opposite ends thereof connected to opposite ends of said movable frame for moving said frame selectively in either direction upon rotation of said shafts.

4. The device according to claim 3 including first and second signal means adjacent each end of said fixed frame and actuated by contact with said movable frame, said first signal means producing a first signal to retard the movement of said movable frame and said second signal means producing a second signal to positively halt the movement of said movable frame.

5. The device according to claim 2 wherein said vacuum chamber is provided with a perforated bottom wall for contact with a sheet to be lifted and said means to mount said pickup head comprises; vertical guide means on said head, rollers on said movable frame in engagement with said guides to guide the vertical movement thereof, first and second transverse shafts rotatably mounted on said movable frame parallel to the opposite sides of said head, a sprocket on the outboard end of each of said shafts, a chain fixed to the periphery of each sprocket and extending thereover in a common direction downwardly with each chain being connected to a corner of said head, a second sprocket means carried by each shaft, said motor means to control the vertical movement of the pickup head comprising a double acting fluid motor carried by said movable frame and including a reciprocating piston rod, a drive chain trained about said second sprocket means and having its opposite ends connected to the respective ends of said piston rod, whereby said head may be moved selectively vertically in either direction upon rotation of said shafts.

6. The device according to claim 5 including limit switch means mounted on said movable frame and switch operating means mounted on said guide means for actuating said switch means at a predetermined point of downward travel of said head, said limit switch means serving to produce a signal for controlling the positioning of said vertically adjustable support means whereby the level of said stack is maintained within a predetermined range as the individual sheets are removed.

7. The device according to claim 2 wherein said vacuum chamber is provided with a perforated bottom wall for contact with a sheet to be lifted and said sensing means comprises; switch means mounted on said pickup head, a vertically movable switch operator extending downwardly and protruding a short distance beyond the bottom wall of said vacuum chamber, said switch operator being moved upwardly to effect actuation of said switch means by contact with the top sheet on said stack, said switch means producing a signal to control the motor means connected to said pickup head to limit the downward movement of the pickup head.

References Cited
UNITED STATES PATENTS

| | | | |
|---|---|---|---|
| 1,224,521 | 5/1917 | Carbis | 271—30 |
| 2,737,389 | 3/1956 | Evans et al. | 271—12 X |
| 2,946,589 | 7/1960 | Spiro et al. | 271—26 |
| 3,218,062 | 11/1965 | Wickland | 271—26 |
| 3,259,417 | 7/1966 | Chapman | 214—8.5 |

M. HENSON WOOD, Jr., *Primary Examiner.*

ALLEN N. KNOWLES, *Examiner.*